June 28, 1932.  E. W. RICE  1,864,935
PROCESS OF MAKING PORTLAND CEMENT
Filed Aug. 27, 1929
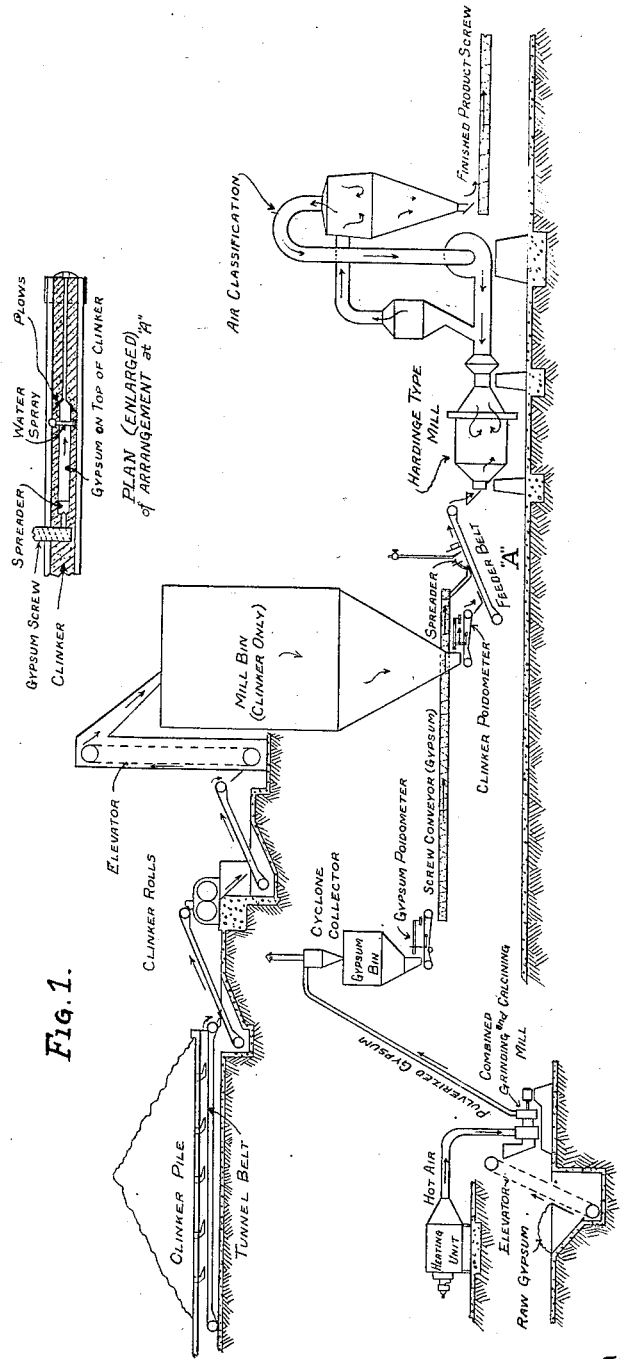
INVENTOR.
EDWARD W. RICE
BY
ATTORNEYS.

Patented June 28, 1932

1,864,935

UNITED STATES PATENT OFFICE

EDWARD W. RICE, OF SANTA CRUZ, CALIFORNIA, ASSIGNOR TO SANTA CRUZ PORTLAND CEMENT COMPANY, OF SAN FRANCISCO, CALIFORNIA, A CORPORATION OF CALIFORNIA

PROCESS OF MAKING PORTLAND CEMENT

Application filed August 27, 1929. Serial No. 388,758.

This invention relates to the manufacture of Portland cement and has for its object a method of manufacture whereby the setting time and plasticity of the cement may be better controlled than by the methods of manufacture heretofore practiced.

In the drawing accompanying this application Fig. 1 is a flow sheet diagrammatically showing the apparatus units which may be used in carrying out my process.

Fig. 2 is an enlarged plan view of the plaster hydrating stage of the process of Fig. 1.

According to the general practice a small percentage of raw gypsum is incorporated in the cement to control the plasticity and setting time. The maximum amount of gypsum permissible is prescribed by the A. S. T. M. specifications as not to exceed a 2% $SO_3$ content in the finished cement on account of its weakening effect on the concrete made with the product.

However it happens that identical quantities of gypsum in different batches of cements often produce dissimilar results, and in my copending patent application filed under Serial No. 285,216, I was the first to show that the degree of fineness to which the gypsum was ground in relation to the fineness of grinding of the clinker was the important factor in determining the nature of the product and not merely the quantity of gypsum present, and that maximum plasticity and set control could be had with a very low percentage of gypsum if reduced all to substantially impalpable condition, and the solution to the problem of so reducing the gypsum in the commercial production of Portland cement was another feature of my copending patent application aforesaid as the grinding of raw gypsum to a condition of substantially all fines or impalpable powder presented a formidable obstacle to the carrying out of the proposed method.

The chief difficulty of grinding the raw gypsum was due to its physical nature in tending to coat the grinding media and to thus exercise a cushioning effect on further reduction in size, at least in standard mills available and within a time consumption permissible in commercial manufacture of cement.

In carrying on my experiments beyond the disclosure of my prior application, I have found that if the gypsum is partially or completely dehydrated at the time of grinding, preferably to a point below that of plaster of Paris, the reduction to fines is more easily accomplished and that such a gypsum product may be run directly with the clinker; in proper proportions to give the plasticity and set desired; into an air classified mill of the Hardinge type and will yield a cement of unusually fine distribution of gypsum as shown by the table below. Other types of mills may be employed with lower yield.

The plaster is produced from raw gypsum containing about 20% of chemically combined water which is reduced by calcination to a point preferably lying below plaster of Paris (or 6% residual water of crystallization), or even to the anhydrous condition, and is ground to a fineness to pass about 90% or more through a 200 mesh sieve before introduction with the clinker for further grinding therewith.

As stated the calcination and grinding of the gypsum is preferably done simultaneously in any suitable mill with application of the necessary heat for calcination to the required degree, as this seems to give a more uniform product.

When this material is used with clinker for Hardinge type mill feed, a cement having the following air analysis is produced.

|  | Gypsum | Clinker |
| --- | --- | --- |
| Per ct. submicroscopic up to 10 microns | 77.3 | 24.2 |
| Per ct. 10 microns up to .074 millimeters dia. (200 mesh) | 22.1 | 63.2 |
| Per ct. larger than .074 mm. dia | 0.6 | 12.6 |
|  | 100.0 | 100.0 |

A comparison of the figures of this table with those of an ordinary tube-mill clinker-gypsum cement will show at once the value of the process when carried out as above described.

However, I have further discovered that if the calcined gypsum as above described, just before introduction into the clinker grinding mill, is wetted with the right amount of water for hydration to restore it to the raw state $CaSO_4.2H_2O$ and ground at once with the clinker before independent set of the plaster can take place, an intimate diffusion of impalpable gypsum throughout the cement is had while at the same time the independent set of the plaster is overcome so that a uniformity of product with control of set and plasticity is had under ordinary manufacturing conditions, which was unobtainable heretofore.

I believe the improvement to be due to the following:

Calcined gypsum of the characteristics described, when mixed with water has a setting time of about five minutes. This setting action is due to the calcine taking back its water of crystallization and recrystallizing into the original state, $CaSO_4.2H_2O$.

While calcined gypsum thoroughly retards the setting time of the pulverized clinker and is satisfactory from that standpoint, yet the separate setting action inherent in the calcined gypsum itself is noticeable in a cement retarded with it and results in an undesirable stiffening of the mass before the normal initial set of the cement or clinker portion has taken place. This may be reduced to a great extent by dead burning.

By hydrating the calcined gypsum so that it reaches the grinding zone before this setting or recrystallization can takes place, this difficulty is entirely obviated and greater plasticity of the cement is secured.

The calcined gypsum is porous and very friable and is therefore an easily pulverized material, but when sufficient water is mixed with it to slurrify it and it is then fed to the grinding mill along with the clinker, it is much more susceptible to the complete dispersion so much desired, providing its admission to the mill is so timed as to reach the grinding zone of the mill before the set and recrystallization of the plaster slurry can take place.

An air analysis of such manufactured cement is as follows:

|  | Gypsum | Clinker |
| --- | --- | --- |
| Per ct. submicroscopic up to 10 microns | 69.3 | 25.1 |
| Per ct. 10 microns up to .074 mm. dia. (200 mesh) | 29.2 | 63.6 |
| Per ct. larger than .074 mm. dia. (200 mesh) | 1.5 | 11.3 |

While air analysis indicates that cement prepared in this way has a lesser percentage of gypsum under 10 microns size than when using dry calcine as before illustrated, it has been found that when wetted calcine is ground in the mills, the clinker particles are to some extent coated with the plastic gypsum—water mass which would naturally show higher gypsum content existing with the coarser clinker particles. This coating of the clinker particles is probably an actual advantage resulting in still greater dispersion of the gypsum content of the cement and which is the end striven for.

The methods for rehydrating the calcine in carrying out my process are many, but the underlying principal is the same. I accomplish the hydration by uniformly distributing the stream of calcined gypsum from the poidometer weighing machine in a thin wide ribbon on top of the clinker which is already on the moving feed belt that supplies the feed to grinding mill, and then spraying this calcined gypsum ribbon with carefully adjusted sprays such that approximately the theoretical quantity of water and no more will be supplied to completely hydrate the gypsum as it passes. The purpose is to thoroughly hydrate the gypsum while at the same time wetting the clinker as little as possible.

Since the feed belt is moving rapidly the rehydrated gypsum is quickly carried into grinding zone of mill before setting action gets under way.

All the above described process is actually in operation on the full capacity of two 10′ x 66″ Hardinge conical mills with reversed current air classifier, each having a capacity of approximately 80–90 barrels of finished cement per hour.

Another method for placing freshly hydrated gypsum on feed belt to grinding mill, while exactly the same in principle as the one now above described is as follows:

Any suitable liquidometer attachment to the poidometers used may be utilized for measuring the desired quantity of water automatically controlled by starting and stopping of the feed belt. The water from liquidometer, and calcined gypsum from poidometer, to be mixed by any suitable mixing device and dropped on clinker which is on moving feed belt on its way to grinding mill.

This latter method will result in more automatic control and provide means for more thorough saturation of the calcine without using an excess of water.

From what has been said it will be manifest that the process may be carried out by various arrangements of the necessary mechanical devices, and the flow sheet of the drawing is merely indicative of one way, and the way in which my process is in daily operation at the plant of the assignee of this application. The various elements on the sheet are named so that taken with the foregoing description of the process they are clear to anyone skilled in the art of cement manufacture and no detailed explanation of the sheet is necessary.

Having thus described my invention I claim:

1. The process of making Portland cement which comprises adding calcined, ground, wetted gypsum while wet to the clinker and grinding the materials together to form the finished cement.

2. The process of making Portland cement which comprises adding calcined, ground, wetted gypsum in the form of a slurry to the clinker and grinding the materials together before setting of the slurried plaster to form the finished cement.

EDWARD W. RICE.